United States Patent Office

3,412,147
Patented Nov. 19, 1968

3,412,147
CHLORO DERIVATIVES OF GLUTAMIC ACID
Janos Kollonitsch, Westfield, N.J., assignor to Merck & Co., Inc., Rahway, N.J., a corporation of New Jersey
No Drawing. Continuation-in-part of application Ser. No. 331,363, Dec. 18, 1963. This application July 25, 1966, Ser. No. 573,142
2 Claims. (Cl. 260—534)

ABSTRACT OF THE DISCLOSURE

Processes for preparing C-chloro α-amino acids, C-hydroxy α-amino acids, and diamino acids, via chlorination of an α-amino acid in an acidic medium in the presence of a free radical initiating catalyst. Novel chloroamino acids.

---

This application is a continuation-in-part of our application Ser. No. 331,363, filed Dec. 18, 1963, which is a continuation-in-part of application Ser. No. 293,146, filed July 5, 1963, and now abandoned, which in turn is a continuation-in-part of United States application Ser. No. 251,742, filed Jan. 16, 1963, and now abandoned.

This invention is concerned with derivatives of amino acids and methods of obtaining the same. More particularly, it is concerned with methods of preparing C-chloro α-amino acids, C-hydroxy α-amino acids, and the corresponding diamino acids.

Prior to the present invention, no method was known for the halogenation of carbon atoms of amino acids and similar compounds. The previous attempts to chlorinate amino acids resulted in the formation of unwanted products such as N-chloroamino acids.

It is an object of the present invention to provide a process for the preparation of C-chloro amino acids wherein the chloro substituent is attached to a carbon unsubstituted by an amino group. Another object is to provide methods of preparing hydroxy amino acids and diamino acids from such C-chloro amino acids. Other objects will be apparent from the detailed description of this invention hereinafter provided.

In accordance with the present invention, it is now found that α-amino acid compounds containing at least a 3 carbon chain and various derivatives thereof can be converted in high yield to the corresponding C-chloro derivatives by treatment with chlorine under free radical conditions in an acidic reaction medium. Thus, in accordance with this invention, α-amino acids, their N-acyl or N,N-diacyl derivatives or their N-lower alkyl or N,N-dilower alkyl or N-lower alkyl N-acyl derivatives, ester, acid halide, amide or their cyclic anhydride variations can be chlorinated by reacting such compounds with free chlorine in a strongly acidic reaction medium. For example, in accordance with this invention, α-aminobutyric acid, valine, glutamic acid, pyroglutamic acid, N-acetyl glutamic acid, N-dimethyl isoleucin, ornithine, arginine, lysine and omega-amino-caproic acid or its lactam (caprolactam) can be chlorinated to obtain the corresponding C-chloro derivatives.

The process of this invention comprises carrying out chlorination of the α-amino acid compound in a highly acidic reaction medium in the presence of a suitable catalyst. As the acid, there may be employed chlorosulfonic acid, sulfuric acid, hydrochloric acid, trifluoroacetic acid, hydrogen fluoride, sulfuric acid containing sulfur trioxide (oleum), pyrosulfuric acid or mixtures thereof. The amount of acid is critical only to the extent that there should be present at least one mole of acid per mole of α-amino acid compound. Usually the acid is employed as a solvent and, in general, it is desirable to employ larger amounts of the acid than the one mole of acid indicated above. Such larger excesses of acid are not harmful in carrying out the process of this invention.

The desired chlorination is preferably effected by treating the α-amino acid compound-acid reaction mixture with chlorine in the presence of a suitable catalyst. Thus, in accordance with a preferred embodiment of this invention, chlorine gas is passed into the reaction mixture under conditions whereby free radical chlorine is produced in situ in the mixture. (Alternatively, the halogenating agent used may be a N-halo imide in a strongly acidic medium, for example, N-chlorosuccinimide and N-bromosuccinimide). This is conveniently accomplished by exposing the reaction mass to a suitable light source such as ultraviolet or fluorescent light. Alternatively, X-rays or chemical free radical initiators may be employed. The preferred chemical catalysts are those known in the art as organic azo-type free radical initiator catalysts. These are aliphatic azo compounds which decompose to give free radicals in solution at elevated temperatures. They are generally tertiary-alkyl-bis-azo-nitriles or carboalkoxy compounds or amides. Examples of such catalysts are α,α'-azo-bis-isobutyronitrile, dimethyl-α,α'-azo-bis-isobutyrate, α,α' - azo-bis-methyl-butyronitrile, dihexyl-α,α'-azo-bis-isobutyrate, α,α'-azo - bis-isobutyramide, α,α'-azo-bis-cyclopropylpropionitrile, α,α' - azo - bis - isobutyl-methylvaleronitrile and α,α,'-azo-bis-methylcapronitrile, and water-soluble catalysts of this type such as azo-bis-isobutyroamidinium hydrochloride, and the like. When the chemical free radical initiators are employed they are used in catalytic amounts and are conveniently added to the reaction mixture while chlorine is being added to it.

The time and temperature conditions of the foregoing described halogenation process are, to some extent, interdependent. Neither of these factors is unduly critical in carrying out the process of this invention. Generally, it is preferred to carry out the chlorination at temperatures within the range of about 75–120° C. although reaction temperatures ranging from about room temperature up to about 160° C. can be utilized. The reaction proceeds somewhat faster at higher temperatures and it is preferred to select operating conditions under which the reaction will be substantially complete in about 2 to 6 hours.

In accordance with another embodiment of the present invention, the C-chloro α-amino acid compound, e.g. the β- or γ-chloro amino acid compound obtained in accordance with the invention, can be further reacted to produce the corresponding γ-hydroxy and β- or γ-amino acid compounds. Thus, the γ-chloro-amino acid compound may be hydrolyzed in aqueous media to form a γ-hydroxy amino acid. For example, γ-chlorovaline can be heated with aqueous hydrohalic acid to produce γ-hydroxyvaline. Also, the halogenated compounds can be reacted with ammonia to produce the corresponding amino compounds. For example, β-chloroglutamic acid can be treated with ammonia to produce (a mixture of stereoisomers of) 2,3-diamino glutaric acid. From this mixture there are isolated the new compounds L-2,3-diamino glutaric acid and a racemic diamino glutaric acid. These new isomeric compounds have been found to have useful properties in enhancing the flavor of foods. Similarly, the other β- and γ-chloro compounds produced in accordance with the present invention can be converted by reaction with ammonia to other useful amino acid derivatives which have a second amino substituent in the β- or γ-position relative to the carboxylic acid group. In addition, other chloro compounds produced in accordance with the present invention are useful in the preparation of amino acids substituted in the γ-position by hydroxy substituents or additional amino substituents, which compounds were only available previously by circuitous and difficult synthetic routes.

The following examples are presented to illustrate the methods of carrying out the present invention.

EXAMPLE 1

Chlorination of α-aminobutyric acid to α-amino-γ-chlorobutyric acid; hydrolysis to homoserine Twenty-six grams (0.25 g.-mol.) of DL-α-aminobutyric acid is dissolved in a mixture of 26.5 ml. of 98% sulfuric acid and 26.5 ml. of 20% fuming sulfuric acid. Chlorine gas is bubbled into the mixture under vigorous stirring at 85–90° C. for six hours; during this time 1.5 g. of azo-bis-isobutyronitrile is added in 36 equal portions. The weight gain indicates an uptake of about 10 g. of chlorine. The clear, thick, oily reaction mixture contains predominantly α-amino-γ-chlorobutyric acid. One-fourth of this mixture is degassed in vacuo, and then refluxed with 150 ml. of water and 18 g. of $Ag_2SO_4$ for about 90 minutes. The mixture is filtered to remove silver chloride. Excess Ag ion is separated by the addition of HCl and then filtering again. The filtrate is charged to 100 ml. of Dowex 50 X 8 resin on the $H^{(+)}$ cycle, the resin column washed with water until acid free and then eluted with 2 N $NH_4OH$. Successive fractions of 50 ml., 225 ml., 50 ml. and 75 ml. are collected. The 225 ml. fraction is evaporated in vacuo to a brown solid, and the solid slurried with dry ethanol. The slurry is filtered to give solid crude α-amino-γ-hydroxybutyric acid, M.P. 155–157° C.

For further purification, one gram of this is refluxed with 3.3 ml. of 48% HBr for 2½ hours. The excess hydrogen bromide is evaporated in vacuo, the residue dissolved in water, and neutralized with dilute $NH_4OH$ with cooling. The solution is then charged to 10 ml. of Dowex 50 X 8 resin on the $NH_4+$ cycle, and the resin eluted with 125 ml. of water, then with 2 N $NH_4OH$. The first 50 ml. of ammonia eluate is concentrated to dryness and the residue dissolved in a small amount of hot water. Dry ethanol is added in the hot water until the solution becomes cloudy. This mixture is chilled at 0° C. overnight and the separated DL-homoserine (α-amino-γ-hydroxybutyric acid) is filtered, washed with ethanol and ether to give substantially pure material, M.P. 185–186° C.

EXAMPLE 2

L-homoserine

L-homoserine is obtained by the procedure of Example 1 using L-α-aminobutyric acid as starting material.

EXAMPLE 3

Chlorination of L-glutamic acid to β- and γ-chloro-L-glutamic acid

Ninety-one and eight-tenths grams (0.5 g. mol.) of L-glutamic acid hydrochloride is dissolved in a mixture of 147 g. of 98% sulfuric acid and 15 g. of water. The clear, colorless solution thus obtained is stirred vigorously in a quartz three-neck round-bottom flask while a fast stream of chlorine gas is introduced and the flask is irradiated by U.V. light (2 Hanovia mercury arc lamps are used, type 679 A–36 installed in the focus of paraboloid aluminum reflectors). After two hours about 66% of the glutamic acid is chlorinated to a mixture of β-chloro-L-glutamic acid and γ-chloro-L-glutamic acid. The clear, slightly yellow liquid product is freed of the excess chlorine by degassing it in vacuo.

The β- and γ-chloro-L-glutamic acids are separated as follows: the reaction mixture is quenched on 500 ml. of ice-water. $BaCl_2$-water solution is added and the precipitated $BaSO_4$ removed by filtration. The filtrate is saturated with HCl gas and kept at 0° C. for twenty-four hours. The solid glutamic acid hydrochloride is separated by filtration and the filtrate concentrated in vacuo at 25–30° C. to dryness. The crystalline residue is a mixture of γ-chloro-L-glutamic acid hydrochloride and β-chloro-L-glutamic acid hydrochloride. The mixture is dissolved in water and chromatographed on Dowex 50 X 8 resin, a sulfonic acid styrene divinylbenzene ion exchange resin, and eluted with 0.1 N hydrochloric acid. The eluate fractions giving a negative test with 2,4-dinitrophenyl hydrazone after heating in strong acid contain γ-chloroglutamic acid. The eluate fractions which give a yellow precipitate when treated with 2,4-dinitrophenyl hydrazone after heating in strong acid contain β-chloro-L-glutamic acid. The yellow precipitate indicates the presence of α-ketoglutaric acid which is formed by the rearrangement of β-chloro glutamic acid by heating in strong acid.

Alternatively, the above-described mixture of β- and γ-chloro-L-glutamic acid is subjected to hydrogenolysis which converts the γ-chloro glutamic acid to glutamic acid, leaving a mixture of glutamic acid and β-chloro glutamic acid from which the components are separated by virtue of the differential solubilities of the hydrochloride salts in water.

The catalytic hydrogenolysis is carried out as follows: the chlorination mixture obtained by chlorinating 0.5 g.-mol. of GA in sulfuric acid is quenched on ice and diluted with water to a volume of 1 liter. 25 g. of 10% Pd on charcoal catalyst is added and the mixture shaken in a hydrogen atomsphere at 40 p.s.i. pressure for about 2 hours. The solution is then filtered from the catalyst and percolated through a Dowex 1 X 2 ion exchange column ($Cl^-$ form). This exchanges the sulfuric acid for hydrogen chloride. The column is developed with water, the ninhydrin-positive fractions concentrated in vacuo to a small volume, and the separated glutamic acid hydrochloride filtered off. The filtrate is evaporated to dryness in vacuo, and an aqueous solution thereof again chromatographed on a cation exchange column made of 3.2 liters of CG–120 resin ($H^+$ form). The column is developed with 1 N HCl. The eluate is concentrated in vacuo, below 30° C. to a small volume, saturated at −10° C. with HCl gas and kept at −10° C. for 2 days. The small amount of solid glutamic acid hydrochloride is filtered off and the mother liquor evaporated in vacuo to a residue which consists substantially of the hydrochloride of β-chloro-L-glutamic acid. Enzymatic assay for glutamic acid indicates the presence of about 10% glutamic acid. This can be destroyed by enzymatic decarboxylation.

Two grams of this product is dissolved in 12 ml. of water, 15 ml. of saturated $NaHCO_3$ solution is added, followed by 20 ml. of an acetate buffer solution (pH 5.2) and the mixture stirred at 38° C. for about 20 hours; meanwhile in 3-hour intervals, a suspension of 20 mg. of glutamic acid decarboxylase enzyme in 2 ml. of acetate buffer is added portionwise at 3-hour intervals. At the end of 20 hours ten ml. of concentrated HCl is added and the solution evaporated to dryness in vacuo (max. 35° C.). The residue is dissolved in 15 ml. of concentrated HCl and the solution saturated with HCl gas at 0° C. The resulting solid is separated and the filtrate again evaporated to dryness in vacuo and the residue flushed with water and acetone. The residue is dissolved in 50 ml. of absolute ethanol, the ethanolic solution treated with decolorizing charcoal, filtered, and the ethanol evaporated. The residue is dissolved in water, 1.2 g. of $Ag_2O$ is added, and after 10 minutes stirring, the mixture is filtered, the filtrate treated with $H_2S$, again filtered, and the filtrate evaporated in vacuo to yield 1.6 g. of substantially pure β-chloro-L-glutamic acid which crystallizes on the addition of a few ml. of water. Acetone is added, the product filtered and dried to give pure crystalline β-chloro-L-glutamic acid. It gives a single (yellow) spot on paper chromatography in a butanol-acetic acid-water system; it gives a perfect C—H—N—Cl analysis for the $C_5H_8O_4NCl$ formula. M.P. 133° C. (dec.). $[\alpha]_D$: +15° in 1 N HCl.

EXAMPLE 4

Chlorination of L-glutamic acid in 50% sulfuric acid

A solution of 78 g. of L-glutamic acid in 300 g. of 50% sulfuric acid is chlorinated as described in paragraph 1, Example 3. After 70 minutes 52% of the L-glutamic acid is transformed into a mixture of γ-chloro-L-glutamic acid and β-chloro-L-glutamic acid. The chlorinated products are recovered by procedures described in Example 3.

EXAMPLE 5

Chlorination of D-glutamic acid: hydrolysis of the chlorination product

Fourteen and seven-tenths grams of D-glutamic acid is chlorinated in the manner described in Example 3, paragraph 1. The reaction product is hydrolyzed with aqueous dilute HCl to a mixture of β-hydroxy-D-glutamic acid and γ-hydroxy-D-glutamic acid.

EXAMPLE 6

Chlorination of valine

Twenty-nine and three-tenths grams (0.25 g.-mol.) of valine is dissolved in a mixture of 15.4 ml. of 98% sulfuric acid and 9.3 ml. of 20% fuming sulfuric acid, 1.0 ml. of $PCl_3$ is added, and then chlorine gas is introduced under vigorous stirring for twelve hours at 80–90° C. During this time 1.25 g. of azo-bis-butyronitrile is added in 50 equal portions. About 6 g. of weight increase is observed. The mixture is then degassed in vacuo. The clear oily product thus obtained contains primarily γ-chloro valine. One-fourth of this product is converted to γ-hydroxy valine as follows: it is diluted with 50 ml. of water, then refluxed under nitrogen for ten hours. This solution is added to a resin column made of 100 ml. of Dowex 50 X 8 on the $H^{(+)}$ cycle. The column is washed acid-free with water, then the amino acids eluted with 2.5 N $NH_4OH$. The first 100 ml. of eluate is discarded. The next 150 ml. of eluate is evaporated to dryness in vacuo, and the resulting residue slurried with absolute ethanol, filtered, and the solid washed with ethanol-ether to give 3.2 g. of crystalline γ-hydroxy valine. One gram of this is purified by refluxing it with 3.3 g. of 48% HBr. The mixture is then evaporated to dryness, the residue is dissolved in water, neutralized with diluted $NH_4OH$, and the lactone of γ-hydroxy valine is absorbed on 10 ml. of Dowex 50 X 8 resin on the $NH_4^{(+)}$ cycle. The column is eluted with 125 ml. of water then with 25 ml. of 2 N $NH_4OH$. The ammonia eluate is evaporated, the residue dissolved in a small amount of water, ethanol and ether added and the precipitated γ-hydroxy valine filtered, M. P. 175–178° C. (dec.).

EXAMPLE 7

2,3-diaminoglutaric acid

Twenty-two grams of 26β-chloro glutamic acid hydrochloride is mixed with 1 liter of concentrated ammonium hydroxide and heated in a steel bomb at 100° C. for 4 hours. After evaporation of the mixture to dryness in vacuo the residue is dissolved in water and the solution put on an ion exchange column of IR–120 resin, H+ cycle. The column is then washed with water, with 1 N HCl (the composition of the effluent is followed by paper chromatography), then with water again. The column is then eluted with ammonia water to desorb the neutral amino acids. The ammonia eluate is concentrated to dryness, the residue redissolved in water, heated, the pH adjusted to pH 5, and an equal volume of ethanol added. On cooling the solution 2,3-diaminoglutaric acid separates in the form of heavy, colorless crystals. They are filtered off and purified by redissolving in hot water and precipitating with ethanol. This product has no optical rotation; it is soluble in 200 ml. of cold water, easily soluble in hot water. M.P. 250° C. (dec.); its IR and proton magnetic resonance spectrum agrees with the assigned formula of racemic 2,3-diamino glutaric acid.

From the mother liquor of the preceding crystallization L-2,3-diamino glutaric acid is isolated as follows: the filtrate is evaporated to dryness and the residue is dissolved in hot water. The pH of the solution adjusted to 6.4, the solution is treated with decolorizing charcoal, filtered and ethanol added to crystallize L-2,3-diamino glutaric acid. The crystals are separated, M.P. 226° C. (dec.). It is purified by recrystallization from aqueous ethanol to give pure L-2,3-diaminoglutaric acid, M.P. 235° C. (dec.) $[α]_D$: +40° C.=1 in 6 N HCl. The product is soluble in cold water and very soluble in hot water.

EXAMPLE 8

Chlorination of alanine in sulfuric acid

A solution of 37.5 g. of DL-alanine (0.5 g.-mol.) in 150 g. of 100% sulfuric acid is irradiated with U.V. light. While under vigorous stirring, a stream of chlorine gas is passed through the solution. After two hours of chlorination, analysis of a sample shows that 84% of the alanine is reacted to β-chloroalanine. The β-chloroalanine is isolated by ion-exchange chromatography of the reaction product on a Dowex 50 X 4 column (H+ form). On elution of this column by 1 N hydrochloric acid, β-chloroalanine is eluted first, followed by unreacted alanine. The fractions containing β-chloroalanine are evaporated to dryness in vacuo to give substantially pure hydrochloride of β-chloroalanine.

EXAMPLE 9

Chlorination of α-amino-γ-carbomethoxy butyric acid

A solution of 32 g. of α-amino-γ-carbomethoxy butyric acid in 160 ml. of trifluoroacetic acid is irradiated by U.V. light, while chlorine gas is passed through it at 32–36° C. for 55 minutes with vigorous stirring. The solvent is then evaporated in vacuo to give a slightly greenish-yellow, clear syrup consisting mainly of the trifluoroacetic acid salt of γ-carbotrichloromethoxy-γ-chloro-α-amino-butyric acid. 150 ml. of water is added to this residue to saponify the ester. On evaporation to dryness in vacuo the trifluoroacetic acid salt of γ-chloroglutamic acid is obtained.

EXAMPLE 10

Chlorination of L-glutamine in trifluoroacetic acid

Fifteen grams of L-glutamine is dissolved in 60 ml. of trifluoroacetic acid and while irradiated by U.V. light, chlorine gas is introduced under vigorous stirring for 50 minutes, while the temperature is kept at 35–40° C. Evaporation of the solvent in vacuo affords a residue of substantially pure γ-chloro-L-glutamine in the form of its trifluoroacetic acid salt.

EXAMPLE 11

Amination of γ-chloro-L-glutamic acid to 2,4-diaminoglutaric acid

Ten and nine-tenths grams of γ-chloro-L-glutamic acid is added to 200 ml. of liquid ammonia and the mixture heated in a steel-bomb at 95° C. for 20 hours. The ammonia is then evaporated and the residue dissolved in 50 ml. of water and put on an ion-exchange column made of Dowex-50, H+ cycle. The chromatogram is developed by washing the column with water, followed by 2 N HCl to wash out the byproducts, then with water again. It is then eluted with 2% ammonia water; the ammoniacal eluate is evaporated to dryness in vacuo to give a mixture of L and meso 2,4-diamino-glutaric acid. By fractional crystallization from ethanol-water this mixture is separated to give substantially pure L and racemic 2,4-diaminoglutaric acid.

EXAMPLE 12

Chlorination of L-lysine in sulfuric acid

Ninety-one and three-tenths grams of L-lysine hydrochloride (0.5 g.-mol.) is dissolved in a mixture of 245 g. of 98% sulfuric acid and 26 g. of water at 65–75° C. After the escape of the hydrogen chloride formed, a practically clear, colorless solution is obtained. Under irridiation by U.V. light and vigorous stirring chlorine gas is introduced at 75–80° C. or 1 hour. The reaction mixture is quenced in ice water containing 80 g. of silver sulfate and excess barium acetate is added, then it is heated at 90° C. for 2 hours to saponify the chlorinated lysine. The excess barium ion is then accurately neutralized by dilute sulfuric acid, the silver ion precipitated by HCl and the $BaSO_4$ precipitate filtered, washed with warm water (until a sample of the filtrate does not give a ninhydrin reaction). This filtrate on anlysis by the Beckman-Spinco analyzer displays 3 major peaks, one being unchanged L-lysine (33% of the charged amount), another peak closely preceding the lysine peak (in an amount corresponding to 20% of the theoretical, based on unrecovered lysine) comprising Δ-hydroxy-L-lysine, and one following it comprising γ-hydroxy-L-lysine (41% of theoretical). The products are isolated by column chromatography on an ion exchange column containing Dowex 50 × 8 resin. The procedure employed is substantially the same as described for the isolation of Δ-hydroxy-L-lysine in Volume 8 of the series "Biochemical Preparations".

The γ-hydroxy lysine may be isolated from the hydrolysis solution in the form of its N-N' dibenzoyl lactone. For the preparation of this the solution is *benzoylated* by Schotten-Bauman's method, using 300% excess of benzoyl chloride over the theoretically needed amount in excess sodium hydroxide solution added at 5–10° C. in 1 hour. The reaction mixture is extracted with ether, acidified with hydrochloric acid, and again extracted by ether and chloroform. The second ether extract is combined with the chloroform extract, evaporated to dryness, then the residue dissolved in toluene and heated under a Dean-Stark trap, where the water formed by the lactonization is removed. The toluene solution is extracted with an aqueous solution of sodium bicarbonate to remove benzoic acid, then evaporated to dryness in vacuo and the residue recrystallized from methanol to furnish N-N' dibenzoyl-γ-hydroxy-L-lysine lactone in the form of colorless crystals, M.P. 206–207° C.

EXAMPLE 13

Chlorination of L-lysine in trifluoroacetic acid

Forty-five and seven-tenths grams of L-lysine hydrochloride is dissolved in 200 ml. of trifluoroacetic acid and chlorinated at 30–40° C. for 10 minutes in the manner described in Example 12. The main reaction product is γ-chloro-L-lysine admixed with unreacted L-lysine and a small amount of the Δ-chloro isomer. The reaction solution is evaporated to dryness in vacuo to obtain a residue of the trifluoroacetic acid salt of γ-chloro-L-lysine (and of some L-lysine left unchlorinated). This residue is dissolved in 50 ml. of concentrated sulfuric acid, then evaporated to dryness again in vacuo to produce a mixture of the sulfuric acid salt of γ-chloro-L-lysine and of unreacted lysine.

EXAMPLE 14

Chlorination of DL-ornithine in sulfuric acid

Forty-two and two-tenths grams of DL-ornithine hydrochloride (0.25 g.-mol.) is dissolved in a mixture of 98% sulfuric acid and 13 g. of water at 70–80° C. Chlorine gas is passed into the mixture for one hour while being irradiated by U.V. light. The principal product of the chlorination is γ-chloro-DL-ornithine. The reaction mixture is degassed in vacuo, then quenched on ice (3 kg.). To the mixture is added 31 g. of silver sulfate and the mixture heated on the steam bath for 2 hours, thus forming γ-hydroxyornithine. To isolate this compound, the saponification mixture is freed of $Ag^+$ by addition of HCl and filtration of AgCl; this is followed by the addition of $BaCl_2$ solution and filtration of the barium sulfate precipitate. The filtrate is then evaporated to dryness in vacuo to obtain a residue of the dihydrochloride salts of ornithine and γ-hydroxy ornithine. This mixture is then separated by column chromatography on a Dowex 50W × 8 column. Alternatively, the γ-hydroxyornithine can be isolated after benzoylation and lactonization (as described in Example 12 for lysine) in the form of N-N'-dibenzoyl-γ-hydroxyornithine lactone, M.P. 236° C. (after recrystallization from methanol).

EXAMPLE 15

Chlorination of glutamic acid in sulfuric acid

Forty-six grams (0.25 mol.) of glutamic acid-hydrochloride is dissolved in 246 g. of 100% $H_2SO_4$ (2.5 mol.) then chlorine gas is passed through for 2½ hours, while the solution is vigorously stirred at 30° under ultraviolet irradiation. The product obtained is a mixture of β-chloro-glutamic acid and γ-chloro-glutamic acid in a ratio of 70 parts of β-chloro isomer to 19 parts of γ-chloro isomer.

EXAMPLE 16

Chlorination of glutamic acid in chlorosulfonic acid

Fifty-five and two-tenths grams (0.3 g.-mol.) of glutamic acid hydrochloride is dissolved in 117 ml. (1.8 mol.) of chlorosulfonic acid, then chlorine is passed through it while irradiated by ultraviolet light at 38° for 2 hours. The halogenated product obtained is a mixture of β-chloroglutamic acid and γ-chloroglutamic acid in a ratio of 73 parts to 22 parts, respectively.

EXAMPLE 17

Chlorination of glutamic acid anhydride in chlorosulfonic acid

To a solution of 64.5 grams of glutamic acid hydrochloride in 138 ml. of chlorosulfonic acid (2.1 mol.) there is added 25.3 ml. (0.35 mol.) of thionyl chloride. After gas evolution subsides, chlorine is passed through the solution under ultraviolet irradiation at 30° C. for 2½ hours. Analysis of the solution indicates that of the 58% of chlorinated glutamic acid, 87% is present as γ-chloroglutamic acid anhydride.

EXAMPLE 18

Chlorination of the methyl ester of glutamic acid in chlorosulfonic acid 48.3 grams of γ-methyl-L-glutamate is dissolved in 117 ml. of chlorosulfonic acid and chlorine passed through the solution at 30–35° C. for 2 hours under ultraviolet light irradiation to form γ-chloro-L-glutamic acid methyl ester. The reaction mixture is quenched by pouring into a mixture of 2.5 l. ice and water, and the product hydrolyzed by heating at 90° C. for about 20 hours to form γ-hydroxy-L-glutamic acid. Of the 64% of halogenated product, analysis indicates that 76% is converted to the γ-hydroxy-L-glutamic acid.

EXAMPLE 19

Chlorination of L-glutamine in chlorosulfonic acid

Through a solution of 29.2 grams (0.2 mol.) of L-glutamine in 90 ml. of chlorosulfonic acid is passed chlorine gas for about 2 hours at 30° C. under ultraviolet irradiation to produce γ-chloro-L-glutamine. The product thus obtained is hydrolyzed to γ-hydroxy-L-glutamic acid by heating at 90° C. for about 20 hours. Of the 58% of halogenated glutamine, a yield of 76% of the γ-hydroxy compound is obtained.

EXAMPLE 20

Chlorination of L-lysine in concentrated hydrochloric acid

A solution of 182.7 grams of L-lysine hydrochloride (1 mol.) in 560 ml. of concentrated hydrochloric acid is prepared and chlorine gas is passed through it under ultraviolet light irradiation at a temperature of 65–70° C. for approximately 50 minutes. The reaction mixture then contains 80% (of theory) γ-chloro-L-lysine and 10% (of theory) Δ-chloro-L-lysine. The mixture is allowed to stand overnight at 5° C.; γ-chloro-L-lysine dihydrochloride crystallizes from solution in white, needle-shaped crystals. The crystalline material is recovered by filtration and recrystallized from water-ethanol to yield the monohydrochloride of γ-chloro-L-lysine, M.P. 229° C.

A solution of the crystalline γ-chloro-L-lysine dihydrochloride is dissolved in an aqueous solution of barium acetate at a pH of from 3 to 5 and heated at 90° C. for a period of 20 hours to form γ-hydroxy-L-lysine hydrochloride. The reaction mixture is acidified with sulfuric acid and the precipitated barium sulfate removed by filtration, leaving the product in the aqueous filtrate. Evaporation of the filtrate to dryness and recrystallization from isopropanol yields γ-hydroxy-L-lysine monohydrochloride. M.P 203° C. $[\alpha]_D = 6.6°$ C.: 2, $H_2O$.

EXAMPLE 21

Chlorination of L-lysine hydrochloride using N-chlorosuccinimide

A solution of 0.25 g.-mol. of L-lysine hydrochloride in 1.25 g.-mol. of 90% sulfuric acid is maintained at a temperature of 75–80° C. for about 3 hours under ultraviolet irradiation. During the 3-hour period, 0.20 g.-mol. of N-chlorosuccinimide is added to the solution in three equal portions. Analysis of the reaction mixture shows a 76% yield of γ-chloro-lysine.

EXAMPLE 22

Chlorination of α-aminobutyric acid in concentrated hydrochloric acid

A solution of 41.2 grams of α-aminobutyric acid in 220 ml. of concentrated hydrochloric acid is prepared and chlorine gas passed through it with ultraviolet light irradiation at 70° C. for a period of 15 minutes γ-chloro-α-aminobutyric acid is formed. The reaction mixture is degassed in vacuo and cooled to approximately 5° C. for about 2 hours, whereupon the hydrochloride of γ-chloro-α-aminobutyric acid crystallizes from solution. The crystalline product is recovered by filtration and washed with concentrated hydrochloric acid and dried under vacuum to give pure material, M.P. 154–156° C.

A solution of α-amiobutyric acid in trifluoroacetic acid is chlorinated under similar conditions to form the γ-chloro-α-aminobutyric acid which is isolated as the trifluoroacetic acid salt.

EXAMPLE 23

Chlorination of ε-amino-caproic acid in concentrated hydrochloric acid

A solution of 39.3 grams of ε-amino-caproic acid in 180 ml. of concentrated hydrochloric acid is prepared and chlorine gas passed through the solution for about 35 minutes at 62–66° C. under ultraviolet light irradiation. Analysis of the reaction mixture indicates a 67% yield of ε-amino-γ-chloro-caproic acid hydrochloride.

What is claimed is:
1. β-Chloro glutamic acid.
2. γ-Chloro glutamic acid.

References Cited

UNITED STATES PATENTS

| | | | |
|---|---|---|---|
| 2,763,610 | 9/1956 | Feichtinger et al. | 204—58.5 |
| 2,870,167 | 1/1959 | Kirby. | |
| 2,389,099 | 11/1945 | Wenner | 260—534 |

OTHER REFERENCES

Eberson, Acta Chem. Scand., vol. 12, pp. 314–23 (1958).

Kollonitsch et al., J.A.C.S., vol. 86 pp. 1857–8 (1964).

Van der Zanden, Chem. Ab., vol. 28; 4701 (1934).

Greenstein et al., Chemistry of Amino Acids, vol. 3 pp. 2419–2423 (1961).

LORRAINE A. WEINBERGER, *Primary Examiner.*

A. P. HALLUIN, *Assistant Examiner.*